(12) United States Patent
Nguyen et al.

(10) Patent No.: US 10,275,242 B2
(45) Date of Patent: Apr. 30, 2019

(54) SYSTEM AND METHOD FOR REAL TIME INSTRUCTION TRACING

(75) Inventors: Huy V. Nguyen, Round Rock, TX (US); Jason W. Brandt, Austin, TX (US); Jonathan J. Tyler, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 13/997,016

(22) PCT Filed: Mar. 30, 2012

(86) PCT No.: PCT/US2012/031569
§ 371 (c)(1),
(2), (4) Date: Jun. 21, 2013

(87) PCT Pub. No.: WO2013/147866
PCT Pub. Date: Oct. 3, 2013

(65) Prior Publication Data
US 2013/0297917 A1    Nov. 7, 2013

(51) Int. Cl.
*G06F 9/30* (2018.01)
*G06F 11/34* (2006.01)
*G06F 11/36* (2006.01)

(52) U.S. Cl.
CPC ...... *G06F 9/30003* (2013.01); *G06F 11/3471* (2013.01); *G06F 11/3636* (2013.01); *G06F 11/3648* (2013.01); *G06F 11/3656* (2013.01); *G06F 11/3476* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 5,642,478 A | 6/1997 | Chen et al. | |
| 5,933,626 A * | 8/1999 | Mahalingaiah | G06F 11/3466 712/227 |
| 6,279,103 B1 | 8/2001 | Warren | |
| 6,732,307 B1 | 5/2004 | Edwards | |
| 7,043,668 B1 | 5/2006 | Treue et al. | |
| 7,065,678 B2 | 6/2006 | Miyayama et al. | |

(Continued)

OTHER PUBLICATIONS

PCT International Search Report for PCT Counterpart Application No. PCT/US2012/031569, 4 pgs., (dated Nov. 29, 2012).

(Continued)

*Primary Examiner* — George Giroux
(74) *Attorney, Agent, or Firm* — Nicholson De Vos Webster & Elliott LLP

(57) ABSTRACT

An apparatus and method are described for real time instruction tracing. For example, a method according to one embodiment comprises: recording user specified address ranges for which tracing is required; monitoring a next linear instruction pointer (NLIP) values and/or branch linear instruction pointer (BLIP) values to determine if address range has been entered; when the range is entered, compressing the NLIP and/or BLIP values and constructing fixed length packets containing the tracing data; and transferring the fixed length packets to a memory execution cluster.

33 Claims, 10 Drawing Sheets

(56) References Cited

U.S. PATENT DOCUMENTS

| | | | | |
|---|---|---|---|---|
| 7,346,758 | B1* | 3/2008 | Baring-Gould | G06F 11/3476 711/207 |
| 8,103,788 | B1* | 1/2012 | Miranda | G06F 13/385 709/224 |
| 2004/0023654 | A1* | 2/2004 | Jang | H04L 41/00 455/435.1 |
| 2004/0066271 | A1* | 4/2004 | Leck | G08C 17/02 340/3.1 |
| 2005/0060521 | A1 | 3/2005 | Wang | |
| 2006/0255985 | A1 | 11/2006 | Agarwala et al. | |
| 2008/0256396 | A1* | 10/2008 | Giannini | G06F 11/3636 714/45 |
| 2009/0204785 | A1* | 8/2009 | Yates, Jr. | G06F 9/30174 711/205 |
| 2010/0228956 | A1* | 9/2010 | Sakamaki | G06F 11/3006 712/225 |
| 2010/0299668 | A1* | 11/2010 | Venkumahanti | G06F 11/3632 718/102 |
| 2013/0332602 | A1* | 12/2013 | Nakil | G06N 99/005 709/224 |

OTHER PUBLICATIONS

PCT Written Opinion of the International Searching Authority for PCT Counterpart Application No. PCT/US2012/031569, 4 pgs., (dated Nov. 29, 2012).

EP Application No. 12872443.2 European Search Report, dated Jan. 5, 2016, 8 pages.

International Preliminary Report on Patentability for Application No. PCT/US2012/031569, dated Oct. 9, 2014, 6 pages.

* cited by examiner

| MTC | CYCLE CNT | CYCLE CNT | CYCLE CNT | 7'b0 | 7'b0 | 7'b0 | 7'b0 | 7'b0 | 7'b0 | TSC | MTC HEADER | ~801 |
|---|---|---|---|---|---|---|---|---|---|---|---|---|
| PIP OR STS | CYCLE CNT | CYCLE CNT | CYCLE CNT | UCODE BYTE 6 | UCODE BYTE 5 | UCODE BYTE 4 | UCODE BYTE 3 | UCODE BYTE 2 | UCODE BYTE 1 | UCODE BYTE 0 | TNT | ~802 |
| FUP OR TIP | CYCLE CNT | CYCLE CNT | CYCLE CNT | LIP BYTE 6 | LIP BYTE 5 | LIP BYTE 4 | LIP BYTE 3 | LIP BYTE 2 | LIP BYTE 1 | LIP BYTE 0 | TNT | ~803 |
| TNT | CYCLE CNT | CYCLE CNT | CYCLE CNT | 7'b0 | 7'b0 | 7'b0 | 7'b0 | 7'b0 | 7'b0 | 7'b0 | TNT | ~804 |

FIG. 8

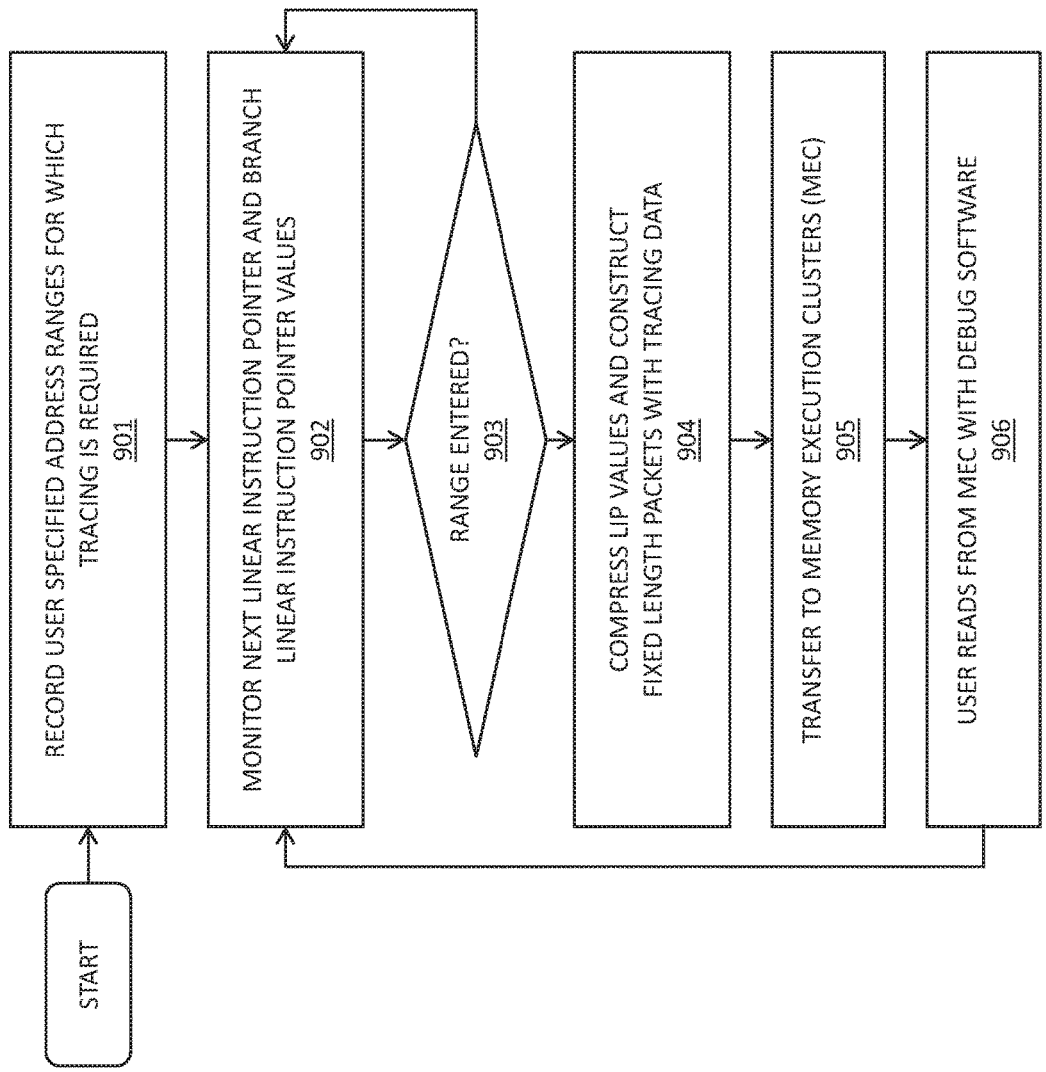

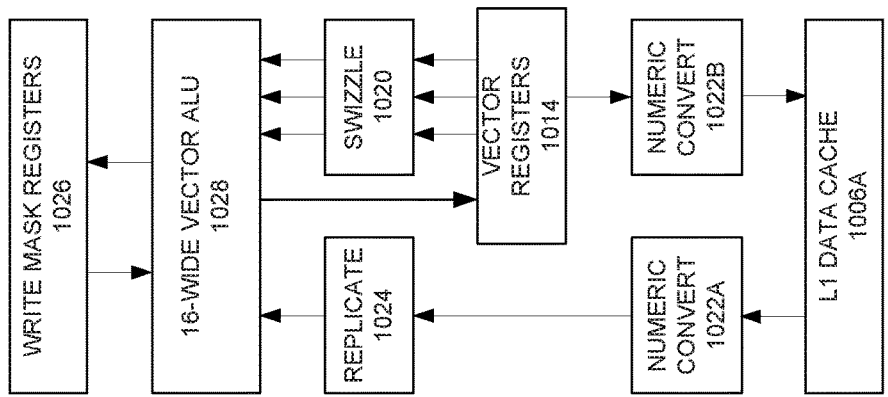
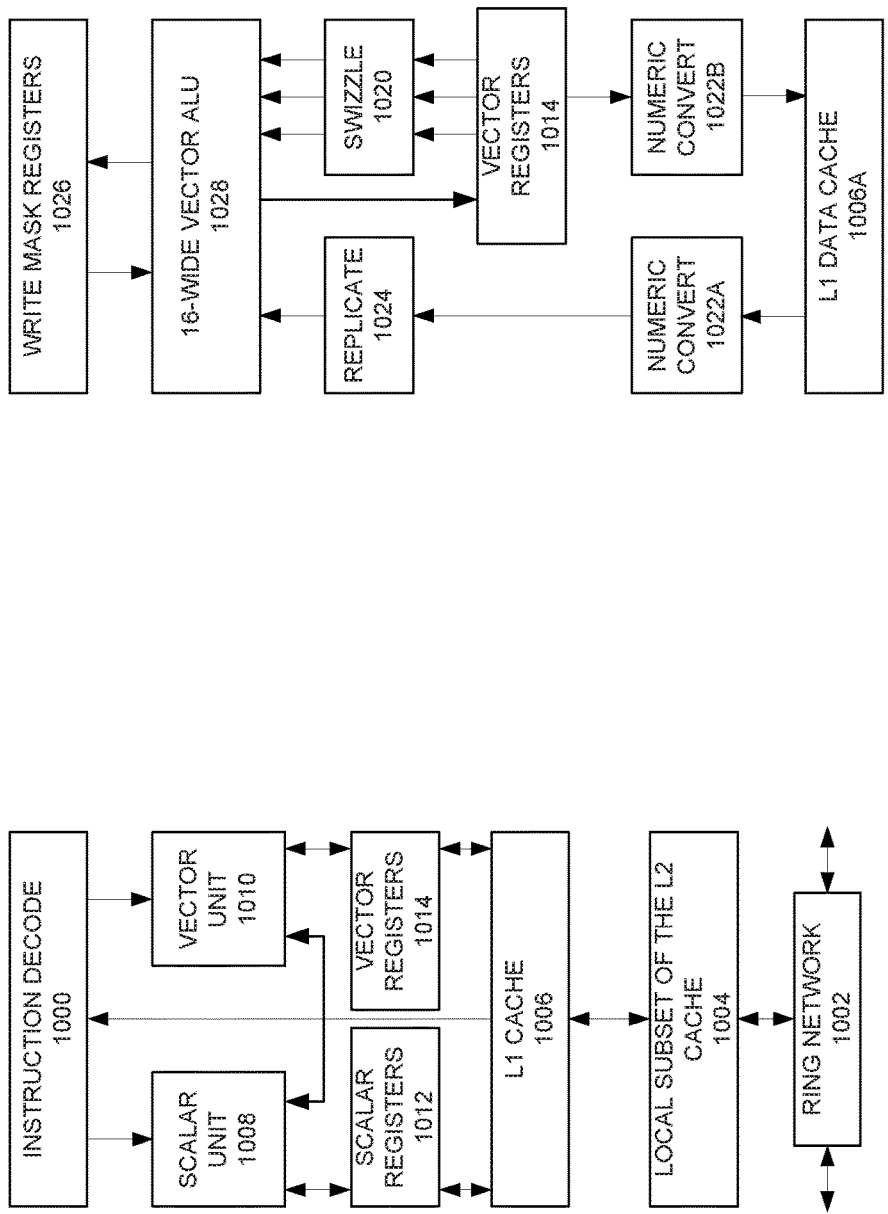

SYSTEM AND METHOD FOR REAL TIME INSTRUCTION TRACING

CROSS-REFERENCE TO RELATED APPLICATION

This patent application is a U.S. National Phase Application under 35 U.S.C. § 371 of International Application No. PCT/US2012/031569, filed Mar. 30, 2012, entitled SYSTEM AND METHOD FOR REAL TIME INSTRUCTION TRACING.

FIELD OF THE INVENTION

Embodiments of the invention relate generally to the field of computer systems. More particularly, the embodiments of the invention relate to a system and method for real time instruction tracing within a processor.

BACKGROUND

An instruction set, or instruction set architecture (ISA), is the part of the computer architecture related to programming, and may include native data types, instructions, register architecture, addressing modes, memory architectures, interrupts, exception handling, and external input and output (I/O) operations. The term instruction generally refers herein to macro-instructions—that is, instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations ("micro-ops" or "uops")—which is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance. An additional set of SIMD extensions, referred to the Advanced Vector Extensions (AVX) (AVX1 and AVX2) and using the Vector Extensions (VEX) coding scheme, been released and/or published (e.g., see Intel® 64 and IA-32 Architectures Software Developers Manual, October 2011; and see Intel® Advanced Vector Extensions Programming Reference, June 2011).

BRIEF DESCRIPTION OF THE DRAWINGS

The following description and accompanying drawings are used to illustrate embodiments of the invention. In the drawings:

FIG. 8 illustrates an exemplary set of packet formats employed in one embodiment of the invention;

FIG. 9 illustrates a method in accordance with one embodiment of the invention;

FIG. 10A is a block diagram of a single processor core, along with its connection to the on-die interconnect network and with its local subset of the Level 2 (L2) cache, according to embodiments of the invention; and FIG. 10B is an expanded view of part of the processor core in FIG. 14A according to embodiments of the invention.

DETAILED DESCRIPTION

Exemplary Processor Architectures and Data Types

Figure 1:
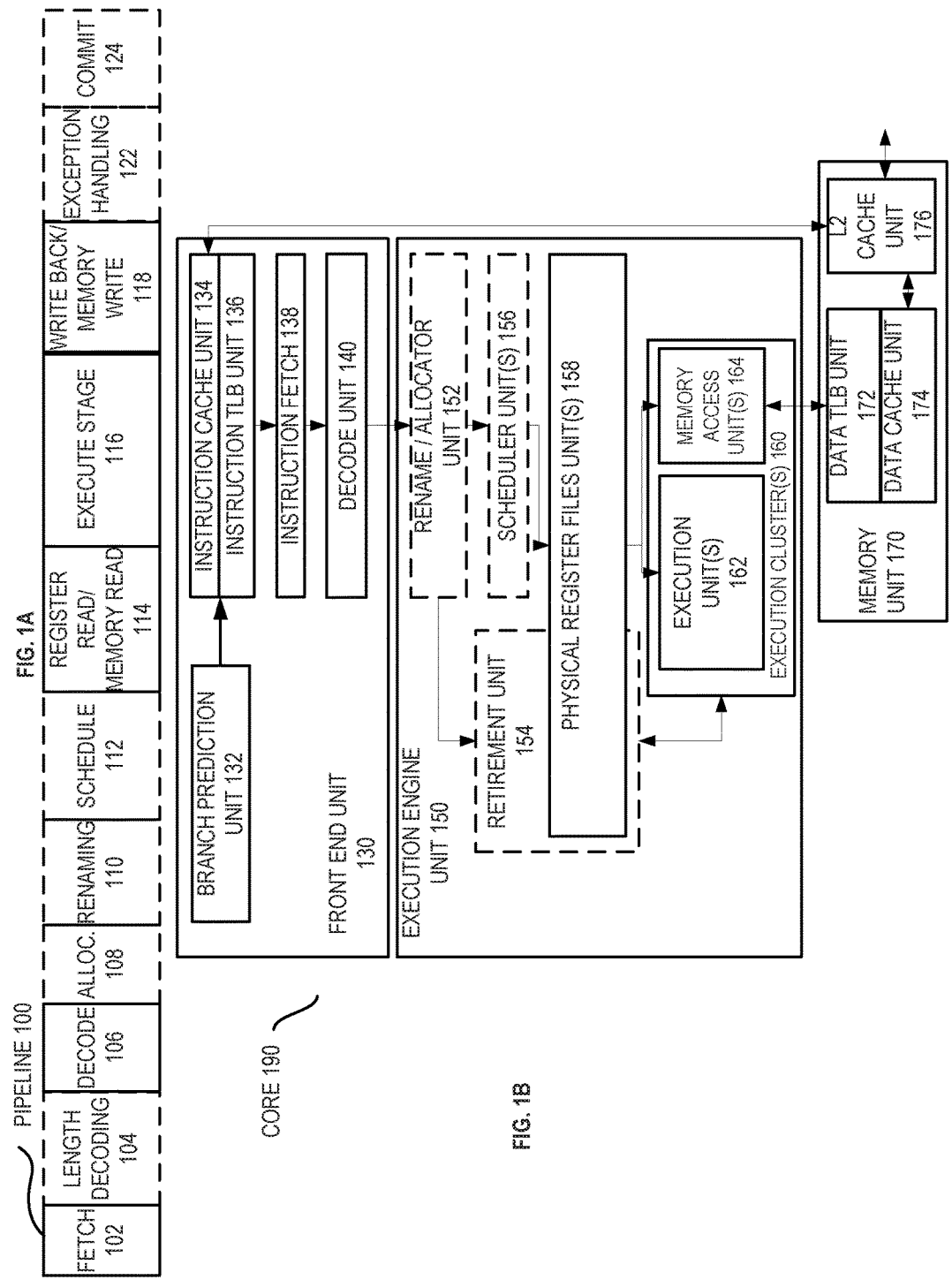
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s)

156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
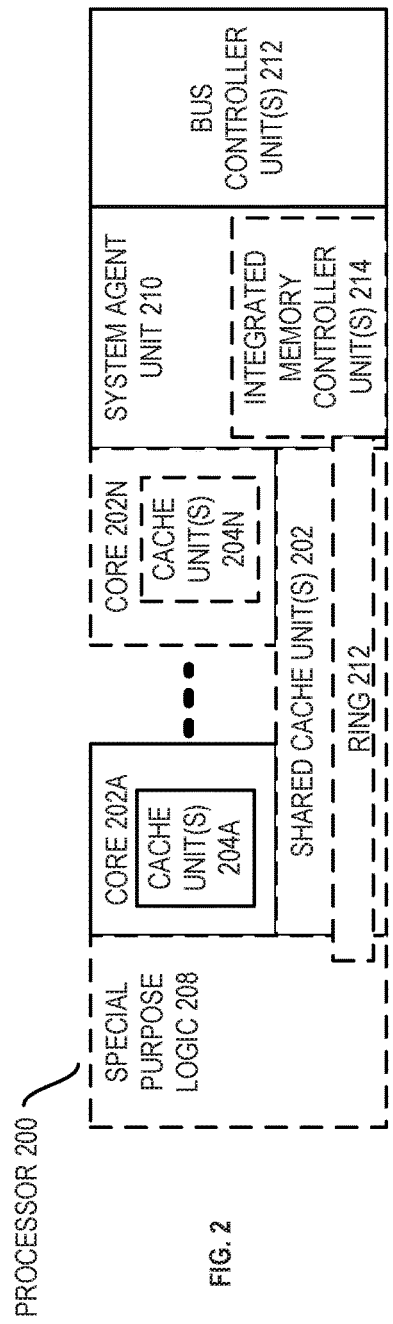
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
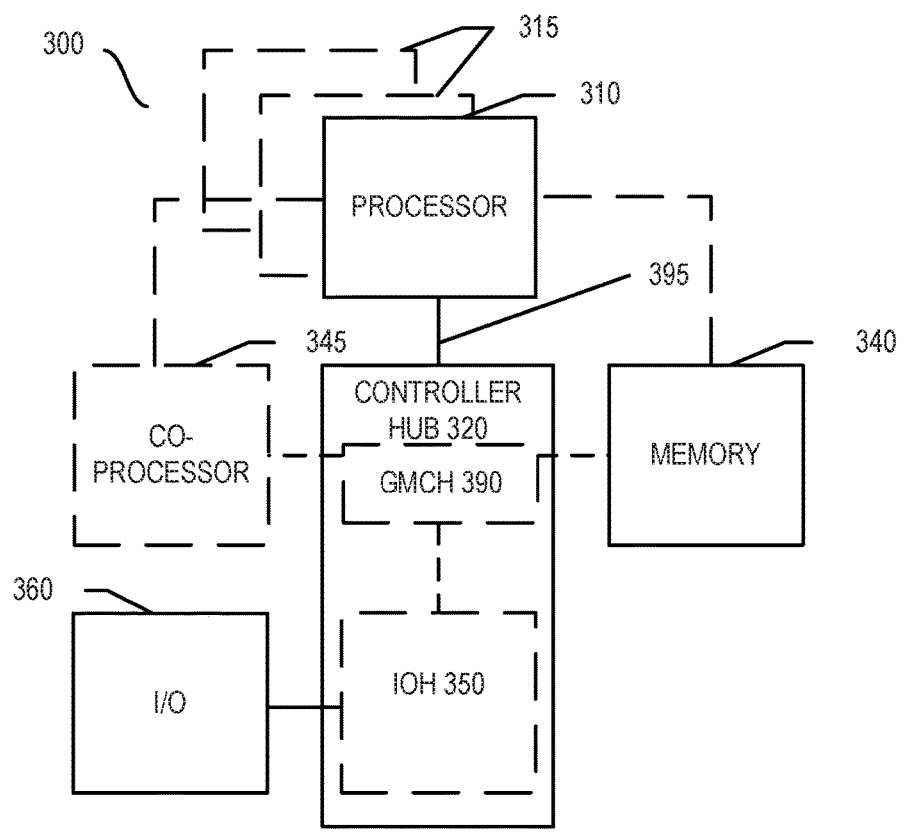
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
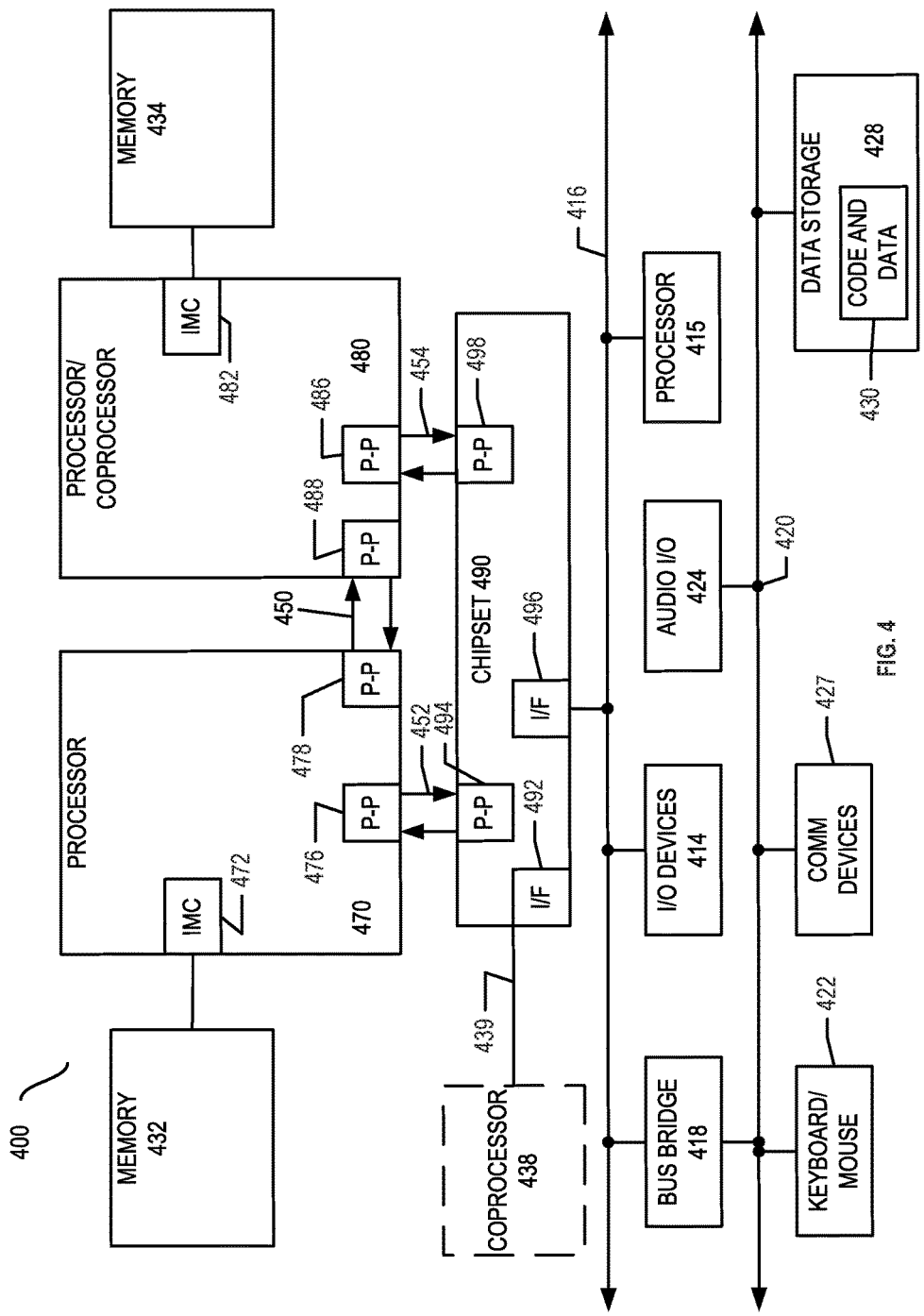
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various 110 devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
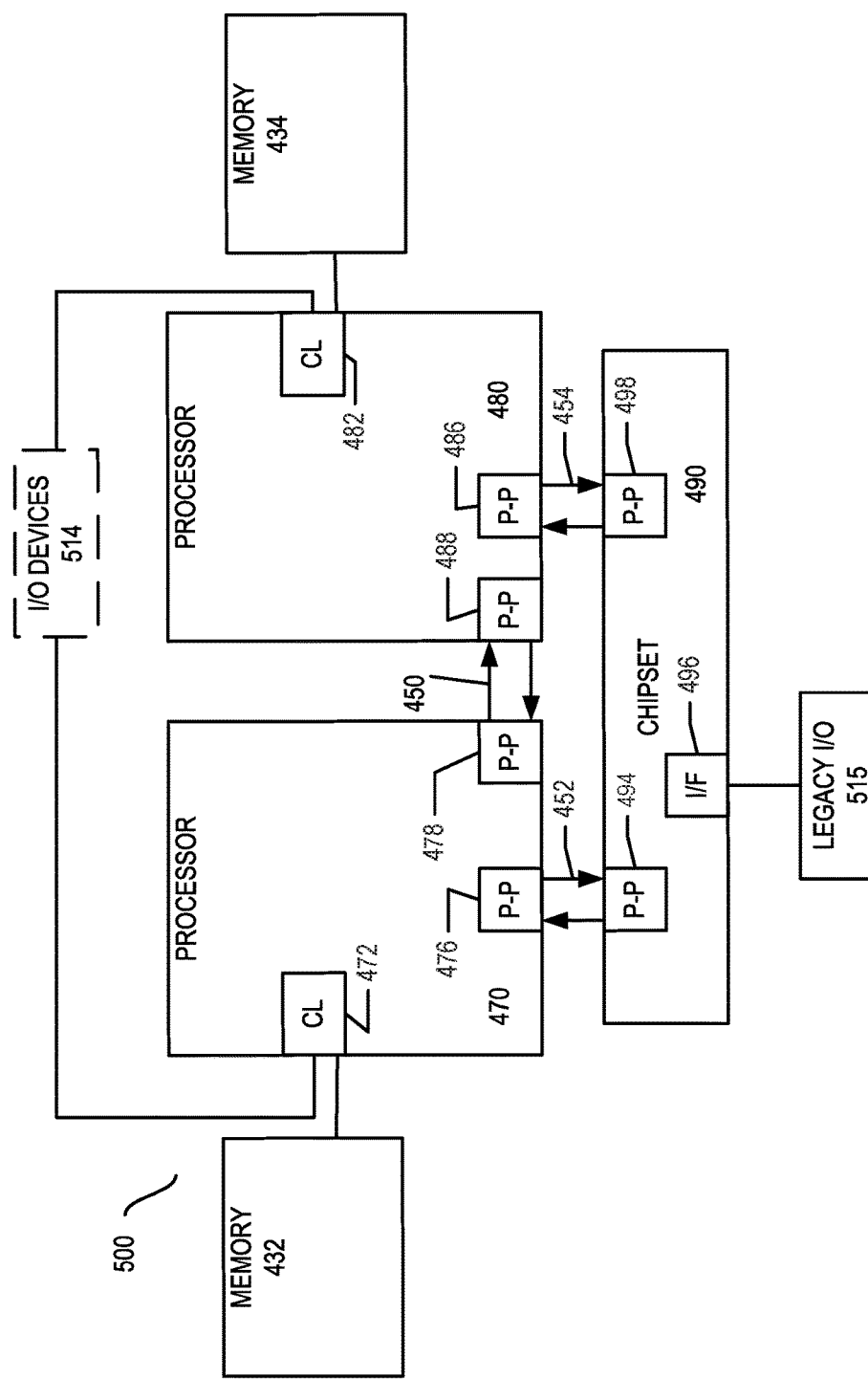
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
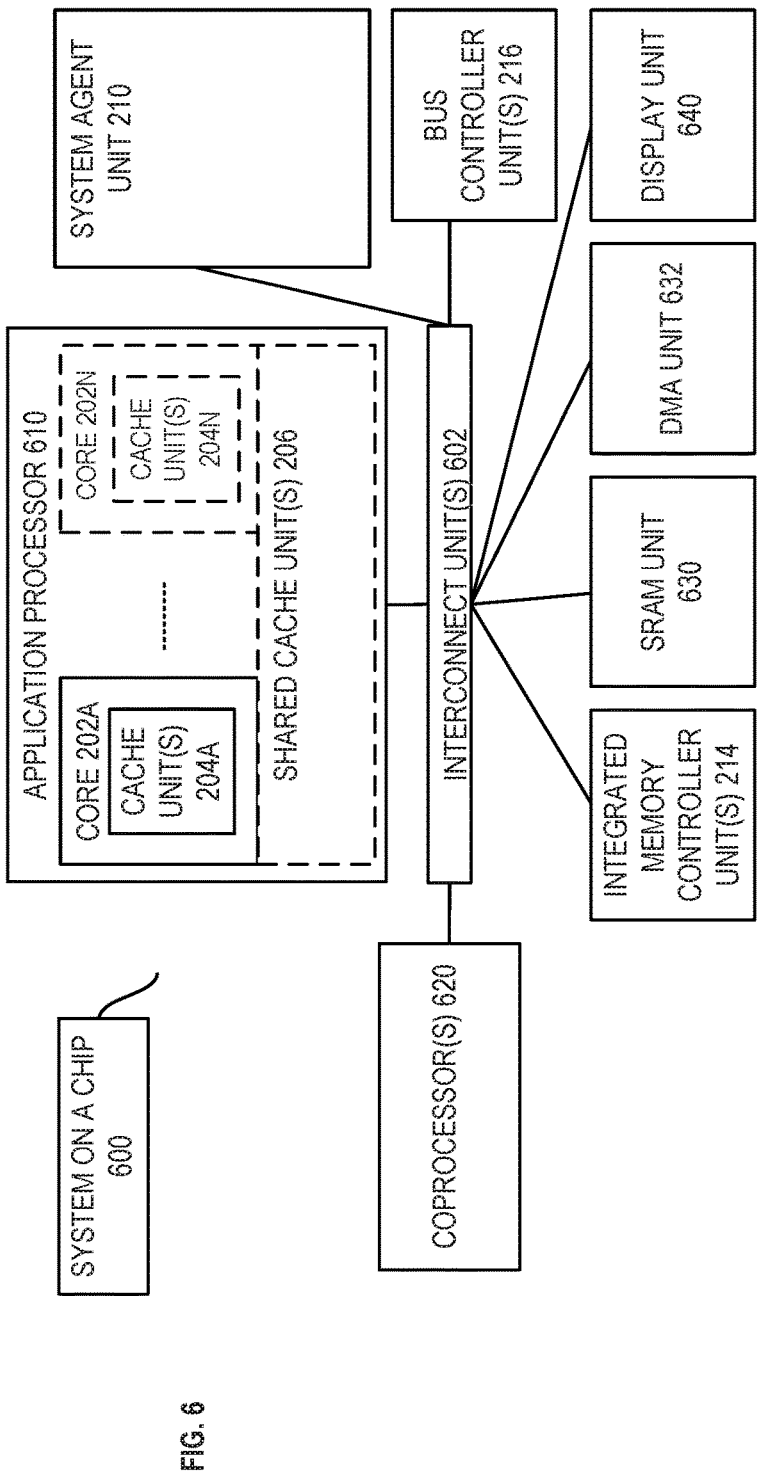
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
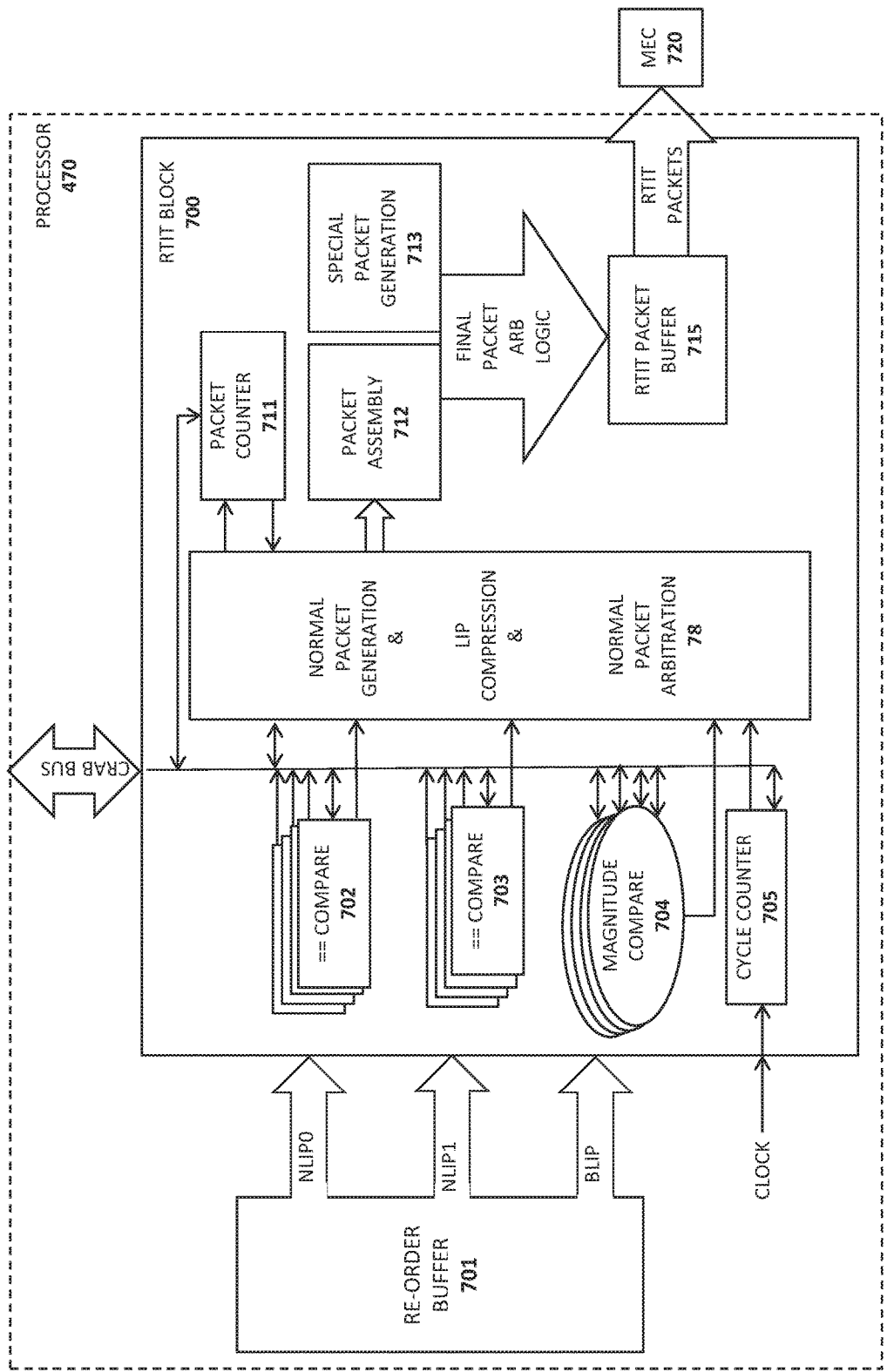
FIG. 7 illustrates one embodiment of an apparatus for performing a real time instruction trace.

FIG. 7 illustrates a real time instruction tracing (RTIT) architecture in accordance with one embodiment of the invention. This embodiment includes a RTIT block 700 comprising sets of address comparison logic 702-703 and magnitude comprison logic 704 for comparing the addresses contained in a next linear instruction pointer (NLIP0, NLIP1) and a branch linear instruction pointer (BLIP) read from a reorder buffer 701 of the processor to specifed address ranges. The results of the comparion operations are fed to a logic block 710 which includes logic for packet generation, linear instruction pointer compression, and packet arbitration. Packet assembly module 712 and special packet generation module 713 work to generate final RTIT packets which are stored in a RTIT packet buffer 715 before being transmitted to memory execution clusters 720 (e.g., sets of dynamic random access memory (DRAM)). As illustrated, the packet generation block 710 operates under control of a packet counter block 711 and cycle counter 705 (which is itself under the control of a clock signal).

In operation, the RTIT block 700 provides for the observance of real time program flow within the processor. Program flow information is compressed, encoded into one of a plurality of RTIT packet formats (examples of which are described below with respect to FIG. 8) and stored in the memory execution clusters 720. In one embodiment, the program flow information may include, for example, branch targets, branches taken/not taken and a variety of other types of program information. After the packetized instruction tracing information is written to the Memory Execution Cluster (MEC), it is written outside the system to either DRAM or memory mapped I/O in the same manner as a normal streaming store. The debug software can then access the tracing information to process and reconstruct the program flow. As described in detail below, all of this is accomplished in real time and without significantly slowing down the execution of the application being traced.

In one embodiment, the NLIP0 and NLIP1 contain* the instruction pointers for the oldest and next oldest microinstructions that have been executed, respectively, while the BLIP contains the instruction pointer for the latest branch micro-instruction to retire. In one embodiment, the comparison logic 702-703 and magnitude comparison logic 704 identifies a particular address range of program code for which instruction tracing is to be performed. Specifically, the NLIP and BLIP values are compared against user-specified address ranges to determine when the program code is currently executing in that range. The program may linearly enter the address range (indicated by the NLIP values) or jump to the address range (indicated by the BLIP value). In one embodiment, the address ranges are programmable via control register coupled over a control register access bus. In one embodiment, the CRAB bus is a known bus type for reading and writing values to programmable control registers.

When a specific address range has been reached in the program code, the results of the compare operations and magnitude compare operation instruct the packet generation and LIP compression module 710 to begin LIP compression and assembling packets used for tracing within that address range. In one embodiment, the cycle counter is also programmable via the CRAB bus and provides a cycle count which is also recorded in certain types of RTIT packets as described below.

FIG. 8 illustrates different RTIT packet formats employed in one embodiment of the invention. These packets are generated by packet assembly logic 712 and special packet generation logic 713 as described below. In one embodiment, the RTIT packets include the following:

Packet Stream Boundary Packet (PSB)
Taken-not-taken Packet (TNT)
Flow Update Packet (FUP)
Target IP Packet (TIP)
Paging Information Packet (PIP)
Stop Trigger Packet (STP)
Mini Time Counter Packet (MTC)
Super Time Sync Packet (STS)

Significantly, in one embodiment of the invention, the software-visible packet format, which uses variable length packets (which is critical to keeping the RTIT output bandwidth low) is not modified. Rather, the embodiments of the invention employ a new internal, fixed length format to simplify processing by the hardware (e.g. always putting the cycle information into the same position; always putting the TNT byte into the same position, etc, as shown in FIG. 8A). The embodiments of the invention described herein store a fixed length packet in local storage (e.g., a buffer) and then use a valid bit field to compress the "empty space" out of each entry of the packet in order to get the variable length field which is software-visible and which does not contain this unused space.

Creating a fixed length packet RTIT architecture for software-visible packets would be easier to build, but the fixed length nature has a significant impact on the bandwidth (because of the "empty space" containing no useful data) and increases the RTIT overhead. Maintaining the variable length for software-visible packets, but utilizing a fixed length internal format results in the best of both worlds—i.e., maintaining the RTIT output bandwidth low due to variable length software-visible packets, but which is significantly easier to implement due to the fixed length internal packet format.

As a result of the fixed length formats shown in FIG. 8, any newly generated packet can be placed into the packet buffer in a deterministic way. Each RTIT packet buffer entry contains 11 bytes as shown in FIG. 8. In the illustrated embodiment, 11 byte packet size is used because the maximum size of all tracing packets is 11 bytes. For any packet with smaller size (less than 11 bytes) such as TNT or MTC packet, the entire 11-byte entry in the packet buffer is used for that packet. Consequently, the complexity of the muxing structures for the packets going into the packet buffer is greatly simplified, significantly reducing the logic required for muxing.

In one embodiment, PSB and STP packets do not need to go into the packet buffer because they are special packets (all constant bytes). They are generated and kept on a side, and muxed into the final mux before sending out to MEC. As a result, the packet buffer entry format does not need to accommodate the format of PSB or STP.

In one embodiment, for each byte of the packet buffer entry, there is a valid bit associated to that byte. As a result, each entry has an 11 bit valid field to indicate which byte in the entry is valid. For example, if a TNT byte of the entry is not applicable or the TNT buffer is empty for that packet buffer entry, then bit 0 of the valid field will be set to 0. Similarly, when the LIP is compressed, then the valid bits of the LIP bytes will be set accordingly.

In one embodiment, when not in cycle accurate mode, the valid bits of the cycle count will all be set to 0. With this 11 byte format of the packet buffer entry, each newly generated packet can go straight to the packet buffer, and each byte in the packet can go to the packet buffer entry in a deterministic way, reducing the complexity of routing and muxing tremendously. Additionally, with this standardized packet format, any new packet types added in the future can be easily accommodated by the hardware as long as the new packets are 11 bytes or less. This allows for future packet type expansion. If the new packet types are more than 11 bytes, then in one embodiment, the standardized packet format is easily expanded to accommodate the new packet types.

FIG. 8 illustrates an exemplary 8× byte RTIT buffer including a read pointer (rd_ptr) and write pointer (wr_ptr) pointing to entries 1 and 0, respectively. FIG. 8 illustrates a MUX 810 selecting data from Entry 1 of the RTIT buffer in response to the read pointer and a packet buffer valid signal (pkt_buf_valids[rd_ptr]). In one embodiment, for each RTIT packet buffer entry, the bytes are read out from lower order byte (byte 0) to upper order byte (byte 10) (a single byte being read is represented by pkt_buf_out[7:0] in FIG. 8). If the valid bit of that byte is set, then that byte is muxed out of the output mux, and its valid bit is cleared in the next cycle so that the next byte can be read out. This operation continues until the last byte of the entry is read and muxed out. Once all valid bytes are read, the next entry of the packet buffer can be read.

FIG. 9 illustrates a method in accordance with one embodiment of the invention. At 901, the user specified address ranges for which tracing is required are recorded and, at 902, the NLIP and BLIP values are compared against the address ranges to determine whether a desired tracing range is entered. When a range is entered (determined at 903), the LIP values are compressed and the fixed length packets are constructed with tracing data at 904. At 905, the packets are transmitted to the memory execution clusters and, at 906, the user may read the tracing data using debug software (or other types of software).

The tracing data may be read directly from the memory execution cluster (MEC). Alternatively, in another embodiment, users do not read the tracing data directly from the MEC. Rather, the MEC collects together the RTIT data that is written into it 1-byte at a time (although another implementation could send more or less bits), and then it writes the data out as a normal streaming store. The streaming store could go to DRAM (or other storage medium) or to a memory-mapped I/O device. Some exemplary memory-mapped I/O devices could be debug hardware that then sends the RTIT data off-die to an external debugging system (which can log the incoming tracing data into its own memory or other storage medium).

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. A method for real time instruction tracing:
recording user-specified address ranges for which tracing is required;
monitoring a next linear instruction pointer (NLIP) values and/or branch linear instruction pointer (BLIP) values from a reorder buffer to determine when an address range for which tracing is required has been entered;
when the address range is entered, constructing fixed length packets containing tracing data, the fixed length packets being visible internally to a hardware device and usable to simplify packet processing by the hardware device, wherein each fixed length packet includes a valid field, having a same number of bits as a number of bytes in the fixed length packet, to indicate which bytes in the fixed length packet contain valid tracing data to be evaluated; and
transferring the fixed length packets to a memory execution cluster, wherein the fixed length packets include at least one packet type selected from:
Paging Information Packet (PIP),
Mini Time Counter Packet (MTC), and
Super Time Sync Packet (STS).

2. The method as in claim 1 further comprising:
reading the fixed length packets from the memory execution cluster to perform debug operations using the tracing data contained in the fixed length packets.

3. The method as in claim 1 wherein the fixed-length packet types further include:
Stop Trigger Packet (STP).

4. The method as in claim 1 wherein the operations of monitoring and constructing are performed while application program code being traced is executed in real time.

5. The method as in claim 1 wherein the length of the packets is fixed to a size equivalent to a maximum tracing packet size.

6. The method as in claim 5 wherein the fixed length comprises 11 bytes.

7. The method as in claim 6 wherein tracing packets types normally having a length less than 11 bytes are increased to 11 bytes by adding additional non-tracing data to the tracing packets.

8. The method for real time instruction tracing of claim 1, wherein the fixed length packet includes a TNT packed in a least significant element position, followed by seven null packets, and followed by three cycle count packets.

9. An apparatus for real time instruction tracing comprising:
means for recording user-specified address ranges for which tracing is required;
means for monitoring a next linear instruction pointer (NLIP) values and/or branch linear instruction pointer (BLIP) values from a reorder buffer to determine when an address range for which tracing is required has been entered;
means for constructing fixed length packets containing tracing data when the address range is entered, the fixed length packets being visible internally to a hardware device and usable to simplify packet processing by the hardware device, wherein each fixed length packet includes a valid field, having a same number of bits as a number of bytes in the fixed length packet, to indicate which bytes in the fixed length packet contain valid tracing data to be evaluated; and
means for transferring the fixed length packets to a memory execution cluster, wherein the fixed length packets include at least one packet type selected from:
Paging Information Packet (PIP),
Mini Time Counter Packet (MTC), and
Super Time Sync Packet (STS).

10. The apparatus as in claim 9 further comprising:
means for reading the fixed length packets from the memory execution cluster to perform debug operations using the tracing data contained in the fixed length packets.

11. The apparatus as in claim 9 wherein the fixed-length packet types further include:
Stop Trigger Packet (STP).

12. The apparatus as in claim 9 wherein the operations of monitoring and constructing are performed while application program code being traced is executed in real time.

13. The apparatus as in claim 9 wherein the length of the packets is fixed to a size equivalent to a maximum tracing packet size.

14. The apparatus as in claim 13 wherein the fixed length comprises 11 bytes.

15. The apparatus as in claim 14 wherein tracing packets types normally having a length less than 11 bytes are increased to 11 bytes by adding additional non-tracing data to the tracing packets.

16. The apparatus as in claim 15 wherein each fixed length packet includes an 11 bit valid field to indicate which bytes in the fixed length packet contain valid tracing data.

17. An apparatus for real time instruction tracing comprising:
a first logic block for recording user specified address ranges for which tracing is required;
a second logic block for monitoring a next linear instruction pointer (NLIP) values and/or branch linear instruction pointer (BLIP) values from a reorder buffer to determine when an address range for which tracing is required has been entered;
a third logic block for compressing the NLIP and/or BLIP values;
a fourth logic block for constructing fixed length packets containing tracing data when the address range is entered, the fixed length packets being visible internally to a hardware device and usable to simplify packet processing by the hardware device, wherein each fixed length packet includes a valid field, having a same number of bits as a number of bytes in the fixed length packet, to indicate which bytes in the fixed length packet contain valid tracing data to be evaluated; and
a fifth logic block for transferring the fixed length packets to a memory execution cluster, wherein the fixed length packets include at least one packet type selected from:
Paging Information Packet (PIP),
Mini Time Counter Packet (MTC), and
Super Time Sync Packet (STS.

18. The apparatus as in claim 17 further comprising:
a sixth logic block for reading the fixed length packets from the memory execution cluster to perform debug operations using the tracing data contained in the fixed length packets.

19. The apparatus as in claim 17 wherein the fixed-length packet types further include:
Stop Trigger Packet (STP).

20. The apparatus as in claim 17 wherein the operations of monitoring, compressing and constructing are performed while application program code being traced is executed in real time.

21. The apparatus as in claim 17 wherein the length of the packets is fixed to a size equivalent to a maximum tracing packet size.

22. The apparatus as in claim 21 wherein the fixed length comprises 11 bytes.

23. The apparatus as in claim 21 wherein tracing packets types normally having a length less than 11 bytes are increased to 11 bytes by adding additional non-tracing data to the tracing packets.

24. The apparatus as in claim 22 wherein each fixed length packet includes an 11 bit valid field to indicate which bytes in the fixed length packet contain valid tracing data.

25. A system for performing real time instruction tracing comprising:
a memory for storing program code; and
a processor for processing the program code to perform the operations of:
recording user-specified address ranges for which tracing is required;
monitoring a next linear instruction pointer (NLIP) values and/or branch linear instruction pointer (BLIP) values from a reorder buffer to determine when an address range for which tracing is required has been entered;
when the address range is entered, constructing fixed length packets containing tracing data, the fixed length packets being visible internally to a hardware device and usable to simplify packet processing by the hardware device, wherein each fixed length packet includes a valid field, having a same number of bits as a number of bytes in the fixed length packet, to indicate which bytes in the fixed length packet contain valid tracing data to be evaluated; and
transferring the fixed length packets to a memory execution cluster, wherein the fixed length packets include at least one packet type selected from:
Paging Information Packet (PIP),
Mini Time Counter Packet (MTC), and
Super Time Sync Packet (STS.

26. The system as in claim 25 wherein the processor executes additional program code to perform the operations of:
reading the fixed length packets from the memory execution cluster to perform debug operations using the tracing data contained in the fixed length packets.

27. The system as in claim 25 wherein the fixed-length packet types further include:
Stop Trigger Packet (STP).

28. The system as in claim 25 wherein the operations of monitoring and constructing are performed while application program code being traced is executed in real time.

29. The system as in claim 25 wherein the length of the packets is fixed to a size equivalent to a maximum tracing packet size.

30. The system as in claim 29 wherein the fixed length comprises 11 bytes.

31. The system as in claim 30 wherein tracing packets types normally having a length less than 11 bytes are increased to 11 bytes by adding additional non-tracing data to the tracing packets.

32. The system as in claim 25 wherein each fixed length packet includes an 11 bit valid field to indicate which bytes in the fixed length packet contain valid tracing data.

33. The system as in claim 25 further comprising:
a display adapter to render graphics images in response to execution of the program code by the processor.

\* \* \* \* \*